March 25, 1952

C. T. EVANS 2,590,302

ELECTROMAGNETIC TIMING RELAY

Filed May 12, 1950

Inventor
Clarence T. Evans
By W. C. Lyon
Attorney

Patented Mar. 25, 1952

2,590,302

UNITED STATES PATENT OFFICE 2,590,302

ELECTROMAGNETIC TIMING RELAY

Clarence T. Evans, Wauwatosa, Wis., assignor to Cutler-Hammer, Inc., Milwaukee, Wis., a corporation of Delaware Application May 12, 1950, Serial No. 161,687

5 Claims. (Cl. 175—320)

This invention relates to timing relays.

More particularly, this invention relates to timing relays wherein a capacitor is used to affect the flow of current through at least one coil of the relay. Ordinarily, paper or other dry type capacitors are used in timing relays, but the use of electrolytic capacitors is to be preferred because they are usually less expensive. However, certain disadvantages have been attendant on the use of electrolytic capacitors, most important of which has been the fact that their capacity tends to change if they are left in the discharged condition for a considerable period of time. This latter occurrence has the undesirable effect of changing the timing characteristic of the particular timing relay in which the electrolytic capacitor is used.

An object of the present invention is to provide a capacitor type timing relay which is particularly suitable for electrolytic capacitors.

Another object of this invention is to provide a timing relay which is economical to manufacture and thoroughly reliable in operation.

Another object is to provide a capacitor type timing relay in which the capacitor is normally fully charged.

Another object is to provide a direct current timing relay which is particularly adaptable for use on alternating current circuits in that the lockout coil will always be fully energized upon closing of the control switch regardless of the instantaneous value of the supply voltage.

Other objects and advantages will hereinafter appear.

In the accompanying drawing.

Figure 1:
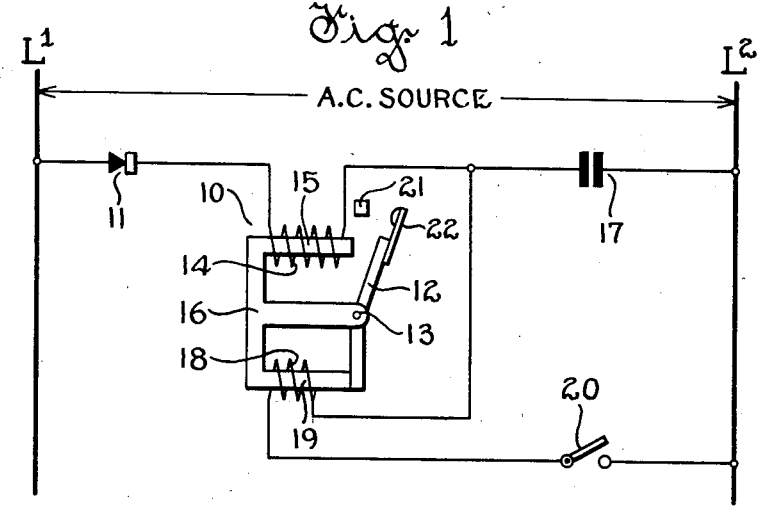
Figure 1 is a diagrammatic showing of a relay constructed in accordance with my invention together with its control instrumentalities and an associated alternating current power supply.

The system shown in Fig. 1 embodies a relay 10 which may be energized from lines L¹, L² of an alternating current power supply. Although this relay is shown as being of the lockout type, it is to be understood that my invention is not restricted to relays of this type and that it may be used with other types of relays, as for example, balanced type relays. It is also to be understood that the relay is shown connected across an alternating current power supply in series with the rectifier 11 by way of example only. The relay 10 could equally well be connected for energization across a direct current power supply, with or without a series connected rectifier.

The relay 10 has an armature 12 which is rotatively supported by a stationary pivot 13. Associated with the upper end of the movable armature 12 is a closing coil 14 which is adapted to magnetize the upper stationary leg 15 of the E-shaped relay structure 16. Closing coil 14 is connected across lines L¹, L² in series with rectifier 11 and capacitor 17, both of which may be of any known type.

Lockout winding 18 is adapted upon energization to magnetize the lower stationary leg 19 of relay structure 16. This latter winding is connected in shunt with capacitor 17 and contains in its circuit a control switch 20.

It will be seen that each of the windings 14, 18 together with their respective legs or cores 15, 19 comprise individual electromagnets by which movement of armature 12 is effected.

The movable armature 12 may be used to effect the opening and closing of mating pairs of contacts 21, 22 in any known manner. Closing winding 14 and lockout winding 18, together with their respective stationary legs or cores 15, 19 are so calibrated and constructed that when the current in both windings is equal the magnetic pull of the closing winding will exceed that of the lockout winding and thus effect closing of contacts 21, 22.

The operation of the relay shown in Fig. 1 is as follows. With control switch 20 open, capacitor 17 is fully charged, it being connected across lines L¹, L² in series with rectifier 11. The same condition would of course apply if the power supply were direct current whether the capacitor be connected across such power supply in series with a rectifier or not. Because capacitor 17 is fully charged there is no current flow through closing winding 14. Closing of switch 20, however, places lockout winding 18 in shunt across capacitor 17 and transient currents immediately begin to flow through the two windings, through the lockout winding starting at a high value and decreasing to a lower value as capacitor 17 continues to discharge through it, while the current through the closing coil starts at a low value and builds up to a higher value. It is obvious that when the closing coil current and the lockout coil current reach some intermediate value the relay can be adjusted to pick up whereupon the lower end of armature 12 will be released by the lockout magnet and the upper end of the armature will move into engagement with the closing magnet to effect closing of contacts 21, 22. The manner of adjusting for a particular pick up point is well known to those skilled in the art.

It will be apparent that the time delay obtained before the armature 12 picked up was caused by the discharge of capacitor 17 as it discharged through lockout winding 18 upon closure of switch 20. In order to drop out the relay, the same control switch must be opened. After it is opened, there will be a time delay before the relay drops out, sufficient to fully charge the capacitor, whereupon current will no longer flow through the closing coil 14 and the relay, being normally biased to open position, will drop out.

Figure 2:
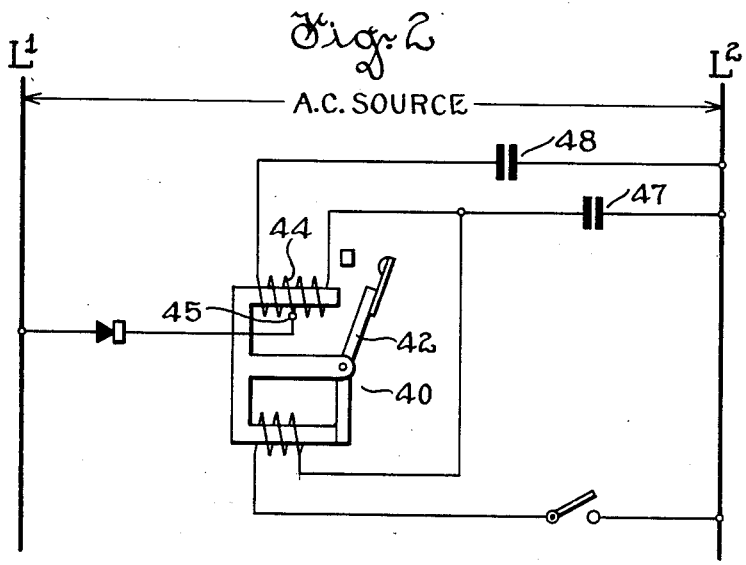
Fig. 2 shows a modification of the relay shown in Fig. 1, which modification may be made for a purpose hereinafter to be described.

In Fig. 2 I have shown a modified form of the relay hereinbefore described. It is useful in those applications where it may be objectionable for the timing relay to momentarily pick up when the main line switch is first closed as will happen with relay 10 as the capacitor is initially being charged. Timing relay 40 is in all respects similar to timing relay 10 with but one exception. Line L¹ is connected to closing winding 44 at its mid-point 45, and both ends of winding 44 are connected to line L² through capacitors 47, 48. With the closing winding connected across the power supply in this manner, when capacitors 47, 48 are initially charged by the closing of the main line switch (not shown), the electromagnetic fields in both halves of the winding will buck each other and prevent pick up of the relay armature 42. As before stated with respect to the relay shown in Fig. 1, the closing winding and lockout winding, together with their stationary legs or cores are so calibrated and constructed that when the current in both windings is equal the magnetic pull of the closing winding will exceed that of the lockout winding and thus effect closing of the relay contacts. The manner of making such adjustment as well as the manner of proportioning the two portions of winding 44 is well known to those skilled in the art.

I claim:

1. In a timing system, a relay comprising an oscillatable armature normally biased to an open position, a closing direct current electromagnet and a lockout direct current electromagnet acting upon and tending to move said armature in opposite directions respectively, said electromagnets being so constructed and calibrated that for equal currents in the winding of each of them the operating effect of said closing electromagnet upon said armature exceeds the effect of said lockout electromagnet, a capacitor electrically connected in series with the winding of said closing electromagnet for connection therewith across a source of direct current supply to maintain said capacitor normally fully charged, and means in circuit with the winding of said lockout electromagnet including a switch operable to connect the latter winding in shunt with said capacitor whereby said capacitor will discharge through said lockout winding and both of said windings will be connected in series.

2. In combination, a relay having an oscillatable armature and a pair of direct current electromagnets acting upon said armature and tending to move it in opposite directions respectively, said electromagnets being so constructed and calibrated that for a given current in the winding of each of them the operating effect of one of the same upon the armature exceeds the effect of the other, a source of direct current, a capacitor connected in series with the winding of the electromagnet having the stronger operating effect across said source of direct current whereby said capacitor is normally fully charged, and means in circuit with the winding of said other electromagnet including a switch operable to connect the latter winding in shunt with said capacitor whereby said capacitor is connected for discharge through said last-mentioned winding and both of said windings are connected in series across said power source.

3. In a timing relay, an oscillatable armature normally biased to open position, a closing electromagnet and a lockout electromagnet acting upon said armature and tending to move it in opposite directions respectively, said electromagnets being so constructed and their windings being so calibrated that for equal currents in both of said windings the operating effect of said closing magnet upon said armature exceeds the effect of said lockout magnet, the winding of said closing electromagnet having a midpoint terminal for connection to one side of a direct current power source, a pair of capacitors individualized to and electrically connected to the respective end terminals of said winding of said closing electromagnet for connection therewith to the opposite side of the same power source, and means in circuit with the winding of said lockout electromagnet including a switch operable to connect the latter winding in shunt with one of said capacitors for effecting actuation of said relay.

4. In a timing relay, in combination, an oscillatable armature, a first electromagnetic winding, a second electromagnetic winding, said windings each being positioned to act upon and effect movement of said armature in opposite directions respectively, a center-tap in said first winding for connection to one side of a direct current power source, at least two capacitors, each end of said first winding being electrically connected to at least one of said capacitors for connection in series therewith to the other side of the same power source whereby said capacitors will be normally fully charged, and means in circuit with said second winding including a switch operable to connect the latter winding in shunt with one of the capacitors connected in series with one end of said first winding for effecting actuation of said relay.

5. In a timing relay, in combination, an oscillatable armature, a first electromagnetic winding, a second electromagnetic winding, said windings each being positioned to act upon and effect movement of said armature in opposite directions respectively, a capacitor connected to one end of said first winding for connection in series with said latter winding across both sides of a direct current power source whereby said capacitor will be normally fully charged, and means in circuit with said second winding including a switch operable to connect the latter winding in shunt with said capacitor for effecting actuation of said relay.

CLARENCE T. EVANS.

REFERENCES CITED

The following references are of record in the file of this patent:

UNITED STATES PATENTS

| Number | Name | Date |
|---|---|---|
| 2,299,941 | Townsend | Oct. 27, 1942 |
| 2,313,528 | Ewing | Mar. 9, 1943 |
| 2,339,581 | Paulson | Jan. 18, 1944 |
| 2,394,294 | Giuseppe | Feb. 5, 1946 |
| 2,427,751 | Snyder | Sept. 23, 1947 |
| 2,437,756 | Rosing | Mar. 16, 1948 |